US012047733B1

(12) United States Patent
Ren et al.

(10) Patent No.: US 12,047,733 B1
(45) Date of Patent: Jul. 23, 2024

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC MICROTECH (CHANGZHOU) CO., LTD., Changzhou (CN)

(*) Notice: Subject to any disclaimer, the term of this patent is extended or adjusted under 35 U.S.C. 154(b) by 0 days.

(21) Appl. No.: 17/914,361

(22) PCT Filed: Jul. 20, 2022

(86) PCT No.: PCT/CN2022/106757
§ 371 (c)(1),
(2) Date: Sep. 26, 2022

(87) PCT Pub. No.: WO2024/000692
PCT Pub. Date: Jan. 4, 2024

(30) Foreign Application Priority Data

Jun. 30, 2022 (CN) ........................ 202221697453.0

(51) Int. Cl.

| | |
|---|---|
| ***H04R 1/24*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ................ *H04R 1/24* (2013.01); *H04R 7/04* (2013.01); *H04R 7/18* (2013.01); *H04R 9/025* (2013.01); *H04R 9/046* (2013.01); *H04R 9/06* (2013.01); *H04R 2400/11* (2013.01)

(58) Field of Classification Search
CPC ... H04R 1/24; H04R 7/04; H04R 7/19; H04R 9/025; H04R 9/046; H04R 9/06; H04R 2400/11
USPC .......................................................... 381/186
See application file for complete search history.

(56) References Cited

U.S. PATENT DOCUMENTS 10,284,945 B2 * 5/2019 Christensen ......... H04R 1/2834
2023/0199398 A1 * 6/2023 Shao ...................... H04R 9/025 381/396
2023/0283956 A1 * 9/2023 Mao ......................... H04R 7/18 381/332

(Continued)

*Primary Examiner* — Sean H Nguyen
(74) *Attorney, Agent, or Firm* — W&G Law Group

(57) ABSTRACT

A coaxial speaker includes a frame, a vibration system, and a magnetic circuit system. The vibration system includes a vibrating diaphragm and a voice coil. The magnetic circuit system includes a transmission cavity, an inner magnetic gap, and an outer magnetic gap. The inner magnetic gap includes a first magnetic gap and a second magnetic gap. The transmission cavity penetrates through the magnetic circuit system. The vibrating diaphragm includes a first vibrating diaphragm, a second vibrating diaphragm, and a third vibrating diaphragm. The third vibrating diaphragm and the first vibrating diaphragm reversely vibrate. The first vibrating diaphragm and the third vibrating diaphragm seal the transmission cavity. The voice coil includes a first voice coil, a second voice coil, and a third voice coil. The coaxial speaker effectively reduces sound leakage of a front receiver during working, and realizes a private call function.

10 Claims, 4 Drawing Sheets

(56) References Cited

U.S. PATENT DOCUMENTS

2023/0403499 A1* 12/2023 Voishvillo .............. H04R 7/127

* cited by examiner

COAXIAL SPEAKER

TECHNICAL FIELD

The present disclosure relates to a field of electroacoustic conversion, and in particular to a coaxial speaker.

BACKGROUND

Coaxial speaker refers to speakers each integrated with two speaker units, and the two speaker units are coaxially disposed. Sound sources of the two speaker units of each of the coaxial speakers are disposed on a front surface of each of the coaxial speakers. That is, sound production directions of the two speaker units are the same. The sound sources of the two speaker units of the coaxial speaker may further be disposed on the front surface and a back surface of each of the coaxial speakers. That is, the sound production directions of the two speaker units are different.

The two speaker units of the coaxial speaker in related art respectively includes a separated vibration system and a separated magnetic circuit system. Usually, one of the two speaker units is configured to generate high pitch sound, and the other one of the two speaker units is configured to generate bass sound. However, the coaxial speakers in the related art cannot effectively reduce sound leakage of a front receiver during working to realize a private call function.

Therefore, it is necessary to provide a new coaxial speaker to solve above technical problems.

SUMMARY

The present disclosure aims to provide a coaxial speaker, which effectively reduces sound leakage of a front receiver during working, and further realizes a private call function.

The coaxial speaker of the present disclosure includes a frame, a vibration system, and a magnetic circuit system. The vibration system and the magnetic circuit system are fixed to the frame. The vibration system includes a vibrating diaphragm and a voice coil. The magnetic circuit system includes a transmission cavity, an inner magnetic gap, and an outer magnetic gap. The inner magnetic gap is defined around the transmission cavity. The outer magnetic gap is defined around the inner magnetic gap. The inner magnetic gap includes a first magnetic gap and a second magnetic gap. The first magnetic gap and the second magnetic gap are disposed at intervals. The transmission cavity penetrates through the magnetic circuit system. The vibrating diaphragm includes a first vibrating diaphragm, a second vibrating diaphragm, and a third vibrating diaphragm. The second vibrating diaphragm is disposed around the first vibrating diaphragm. The third vibrating diaphragm and the first vibrating diaphragm reversely vibrate. An outer periphery of the first vibrating diaphragm and an inner periphery of the second vibrating diaphragm are both fixed to the magnetic circuit system. The outer periphery of the second vibrating diaphragm is fixed to the frame. An outer periphery of the third vibrating diaphragm is fixed to one side, facing away from the first vibrating diaphragm, of the magnetic circuit system. The first vibrating diaphragm and the third vibrating diaphragm seal the transmission cavity. The voice coil includes a first voice coil, a second voice coil, and a third voice coil. The first voice coil is inserted into the first magnetic gap and drives the first vibrating diaphragm to vibrate. The second voice coil is inserted into the outer magnetic gap and drives the second vibrating diaphragm to vibrate. The third voice coil is inserted into the second magnetic gap and drives the third vibrating diaphragm to vibrate.

Furthermore, the magnetic circuit system includes a magnetic yoke and a primary magnetic portion. The primary magnetic portion is surrounded by the outer magnetic gap. The primary magnetic portion includes a first magnet, a second magnet, and a primary pole core. The first magnet is fixedly disposed on the magnetic yoke. The second magnet is disposed on one side, facing the first vibrating diaphragm, of the first magnet. A first through hole penetrates through the first magnet. A second through hole penetrates through the second magnet. The primary pole core includes a wall portion and a plate portion. The plate portion is connected to the wall portion. The plate portion is clamped between the first magnet and the second magnet. A first end of the wall portion is inserted into the first through hole and divides the first through hole into the second magnetic gap and a first cavity. A second end of the wall portion is inserted into the second through hole and divides the second through hole into the first magnetic gap and a second cavity. A third through hole penetrates through the magnetic yoke. The transmission cavity includes the third through hole, the first cavity, and the second cavity.

Furthermore, the wall portion includes a first wall portion and a second wall portion. The first wall portion is inserted into the first through hole. The second wall portion is inserted into the second through hole. The plate portion includes a first plate portion and a second plate portion. The first plate portion extends from the first wall portion and is fixedly disposed on the first magnet. The second plate portion extends from the second wall portion and is fixedly disposed between the first plate portion and the second magnet.

Furthermore, the first wall portion is a continuous annular structure or/and the second wall portion is a continuous annular structure.

Furthermore, the outer periphery of the first vibrating diaphragm and the inner periphery of the second vibrating diaphragm are both fixed to the second magnet. The outer periphery of the third vibrating diaphragm is fixed to one side, facing away from the primary magnetic portion, of the magnetic yoke.

Furthermore, the magnetic circuit system further includes a secondary magnetic portion. The secondary magnetic portion is fixedly disposed between the magnetic yoke and the frame. The secondary magnetic portion and the primary magnetic portion are spaced to form the outer magnetic gap.

Furthermore, the secondary magnetic portion includes a third magnet and a secondary pole core. The third magnet is fixedly disposed on the magnetic yoke. The secondary pole core is fixedly disposed between the third magnet and the frame.

Furthermore, the second vibrating diaphragm includes an inner diaphragm body, an outer diaphragm body, and a framework. The outer diaphragm body is disposed around the inner diaphragm body. The framework includes a flat plate portion and a first connecting portion. The flat plate portion is connected to the inner diaphragm body and the outer diaphragm body. The first connecting portion extends from the flat plate portion towards the outer magnetic gap. The first connecting portion is connected to the second voice coil.

Furthermore, the framework further includes a second connecting portion. The second connecting portion extends from the flat plate portion. The second connecting portion is spaced apart from the first connecting portion. The vibration system further includes elastic supporting components. A first end of each of the elastic supporting components is connected to the second connecting portion. A second end of each of the elastic supporting components is connected to the frame.

Furthermore, fixing frames are fixedly disposed on two opposite sides of the magnetic circuit system. The outer periphery of the first vibrating diaphragm and the outer periphery of the third vibrating diaphragm are fixed to inner walls of the fixing frames.

Compared with related art, the present disclosure provides the coaxial speaker, and the first vibrating diaphragm and the first voice coil form a first vibrating unit. The second vibrating diaphragm and the second voice coil form a second vibrating unit. The third vibrating diaphragm and the third voice coil form a third vibrating unit. The coaxial speaker of the present disclosure provides reverse phase sound waves through reversely vibrating the first vibrating unit and the third vibrating unit, so that sound waves of the coaxial speaker are counteracted in a far field through the reverse phase sound waves, which reduces sound leakage of a receiver of the first vibrating unit during working, and further realizes the private call function.

DETAILED DESCRIPTION

Figure 1:
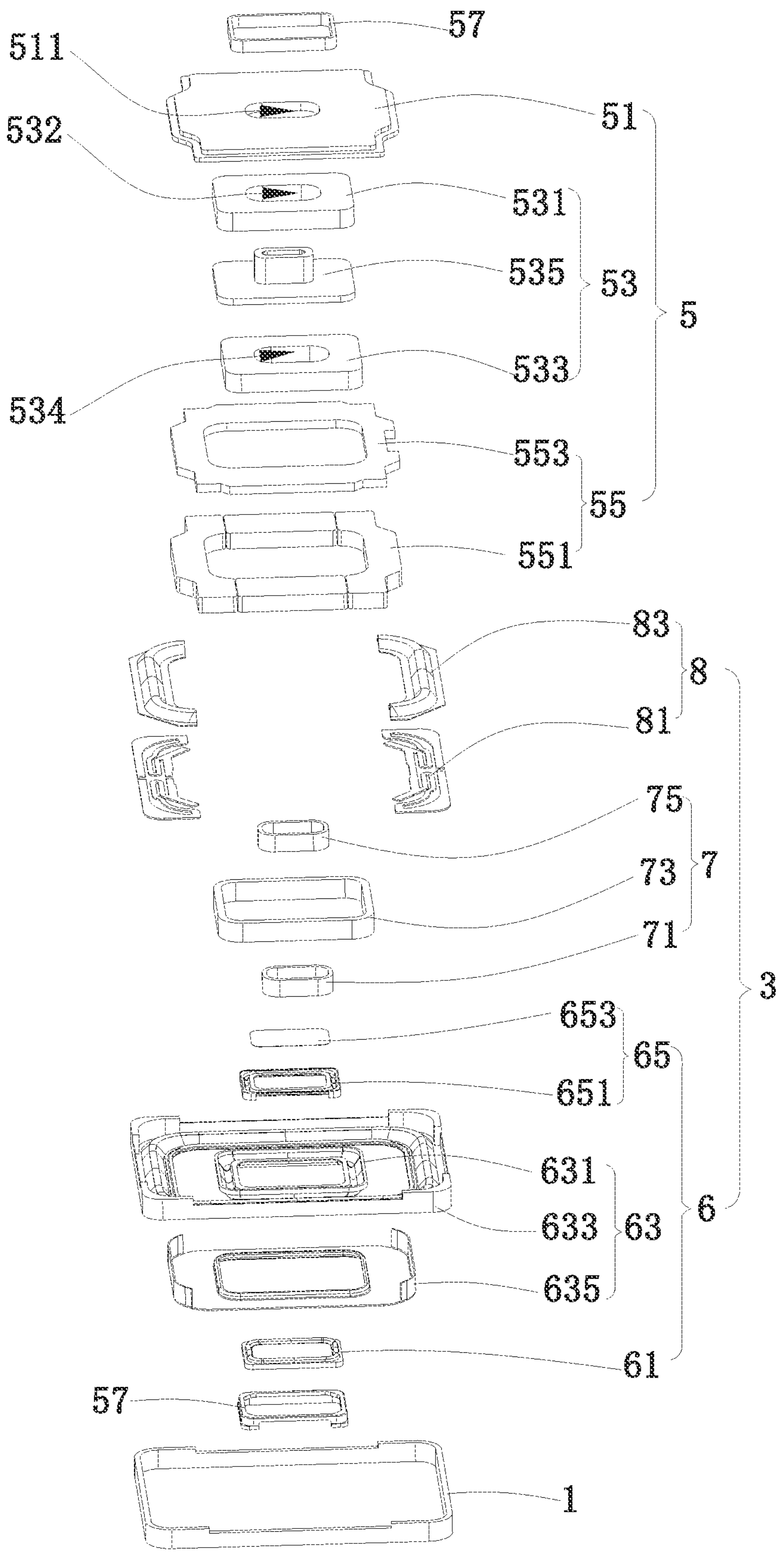
FIG. 1 is an exploded schematic diagram of a coaxial speaker according to one embodiment of the present disclosure.

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Referring to FIGS. 1-5, a coaxial speaker includes: a frame 1, a vibration system 3, and a magnetic circuit system 5. The vibration system 3 and the magnetic circuit system 5 are fixed to the frame 1.

The vibration system 3 includes a vibrating diaphragm 6 and a voice coil 7. The voice coil 7 drives the vibrating diaphragm 6 to vibrate and produce sound.

The vibrating diaphragm 6 includes a first vibrating diaphragm 61, a second vibrating diaphragm 63, and a third vibrating diaphragm 65. The second vibrating diaphragm 63 is disposed around the first vibrating diaphragm 61. The third vibrating diaphragm 65 and the first vibrating diaphragm 61 reversely vibrate. An outer periphery of the first vibrating diaphragm 61 and an inner periphery of the second vibrating diaphragm 63 are both fixed to the magnetic circuit system 5. The outer periphery of the second vibrating diaphragm 63 is fixed to the frame 1. An outer periphery of the third vibrating diaphragm 65 is fixed to one side, facing away from the first vibrating diaphragm 61, of the magnetic circuit system 5.

The voice coil 7 includes a first voice coil 71, a second voice coil 73, and a third voice coil 75. The first voice coil 71 drives the first vibrating diaphragm 61 to vibrate. The second voice coil 73 drives the second vibrating diaphragm 63 to vibrate. The third voice coil 75 drives the third vibrating diaphragm 65 to vibrate. The first vibrating diaphragm 61 and the first voice coil 71 form a first vibrating unit. The second vibrating diaphragm 63 and the second voice coil 73 form a second vibrating unit. The third vibrating diaphragm 65 and the third voice coil 75 form a third vibrating unit. The first vibrating unit and the second vibrating unit both generate sound on a first side of the coaxial speaker. The third vibrating unit generates sound on a second side of the coaxial speaker.

The first vibrating diaphragm 61, the second vibrating diaphragm 63, the third vibrating diaphragm 65, the first voice coil 71, the second voice coil 73, and the third voice coil 75 are coaxially disposed. In this way, vibrating units of the vibration system 3 are coaxially disposed.

It should be noted that, under a driving action of the first voice coil 71, sound generated by vibration of the first vibrating diaphragm 61 has a first audio range. Under a driving action of the second voice coil 73, sound generated by vibration of the second vibrating diaphragm 63 has a second audio range. Under a driving action of the third voice coil 75, sound generated by vibration of the third vibrating diaphragm 65 has the first audio range. In this way, a range of frequency bands of the coaxial speaker is increased. Meanwhile, the first vibrating diaphragm 61 and the third vibrating diaphragm 65 are respectively disposed on two opposite sides of the magnetic circuit system 5. The first vibrating diaphragm 61 and the third vibrating diaphragm 65 reversely vibrate. Reversely vibrating the first vibrating unit and the third vibrating unit provides reverse phase sound waves, so that sound waves of the coaxial speaker are counteracted in a far field through the reverse phase sound waves, which reduces sound leakage of a receiver of the first vibrating unit during working, and realizes the private call function. When the first vibrating unit serves as the receiver to work, the third vibrating unit serves as an active noise reduction unit to work.

In the embodiment, preferably, the first audio range is high-frequency audio. That is, the first vibrating diaphragm 61 and the third vibrating diaphragm 65 provide high-frequency sound effects. The second audio range is low-frequency audio. That is, the second vibrating diaphragm 63 provides low-frequency sound effects.

The magnetic circuit system 5 includes a transmission cavity 5A, an inner magnetic gap 5B, and an outer magnetic gap 5C. The inner magnetic gap 5B is defined around the transmission cavity 5A. The outer magnetic gap 5C is defined around the inner magnetic gap 5B. The inner magnetic gap 5B includes a first magnetic gap 5B1 and a second magnetic gap 5B3. The first magnetic gap 5B1 and the second magnetic gap 5B3 are disposed at intervals. The transmission cavity 5A penetrates through the magnetic circuit system 5. The first voice coil 71 is inserted into the first magnetic gap 5B1. The second voice coil 73 is inserted into the outer magnetic gap 5C. The third voice coil 75 is inserted into the second magnetic gap 5B3. The first vibrating diaphragm 61 and the third vibrating diaphragm 65 seal the transmission cavity 5A. Therefore, the first vibrating diaphragm 61 and the third vibrating diaphragm 65 further ensure waterproofness of a first audio unit.

Specifically, the magnetic circuit system 5 includes a magnetic yoke 51, a primary magnetic portion 53, and a secondary magnetic portion 55. The primary magnetic portion 53 is surrounded by the outer magnetic gap 5C. The secondary magnetic portion 55 is fixedly disposed between the magnetic yoke 51 and the frame 1. The secondary magnetic portion 55 and the primary magnetic portion 53 are spaced to form the outer magnetic gap 5C.

A third through hole 511 penetrates through the magnetic yoke 51.

The primary magnetic portion 53 includes a first magnet 531, a second magnet 533, and a primary pole core 535. The first magnet 531 is fixedly disposed on the magnetic yoke 51. The second magnet 533 is disposed on one side, facing the first vibrating diaphragm 61, of the first magnet 531.

In the present embodiment, the outer periphery of the first vibrating diaphragm 61 and the inner periphery of the second vibrating diaphragm 63 are both fixed to the second magnet 533. The outer periphery of the third vibrating diaphragm 65 is fixed to one side, facing away from the primary magnetic portion 53, of the magnetic yoke 51.

A first through hole 532 penetrates through the first magnet 531. That is, the first magnet 531 is of a continuous annular structure.

A second through hole 534 penetrates through the second magnet 533. That is, the second magnet 533 is of the continuous annular structure.

The primary pole core 535 includes a wall portion 536 and a plate portion 537. The plate portion 537 is connected to the wall portion 536. The plate portion 537 is clamped between the first magnet 531 and the second magnet 533. A first end of the wall portion 536 is inserted into the first through hole 532 and divides the first through hole 532 into the second magnetic gap 5B3 and a first cavity 5D. A second end of the wall portion 536 is inserted into the second through hole 534 and divides the second through hole 534 into the first magnetic gap 5B1 and a second cavity 5E. The transmission cavity 5A includes the third through hole 511, the first cavity 5D, and the second cavity 5E.

Figure 2:
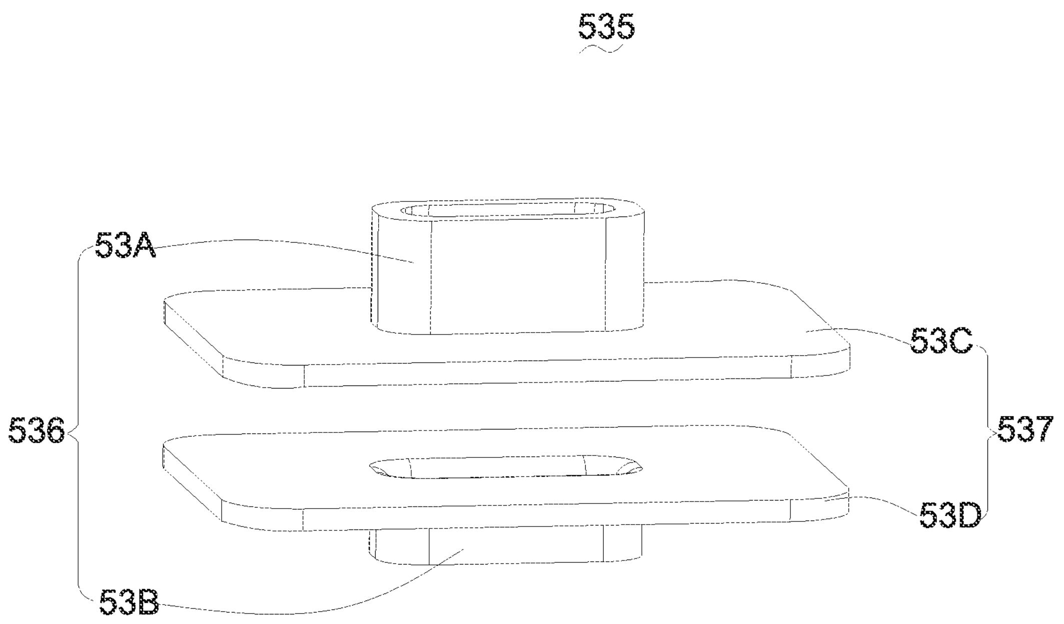
FIG. 2 is a structural schematic diagram of a primary pole core in the coaxial speaker shown in FIG. 1.
Figure 5:
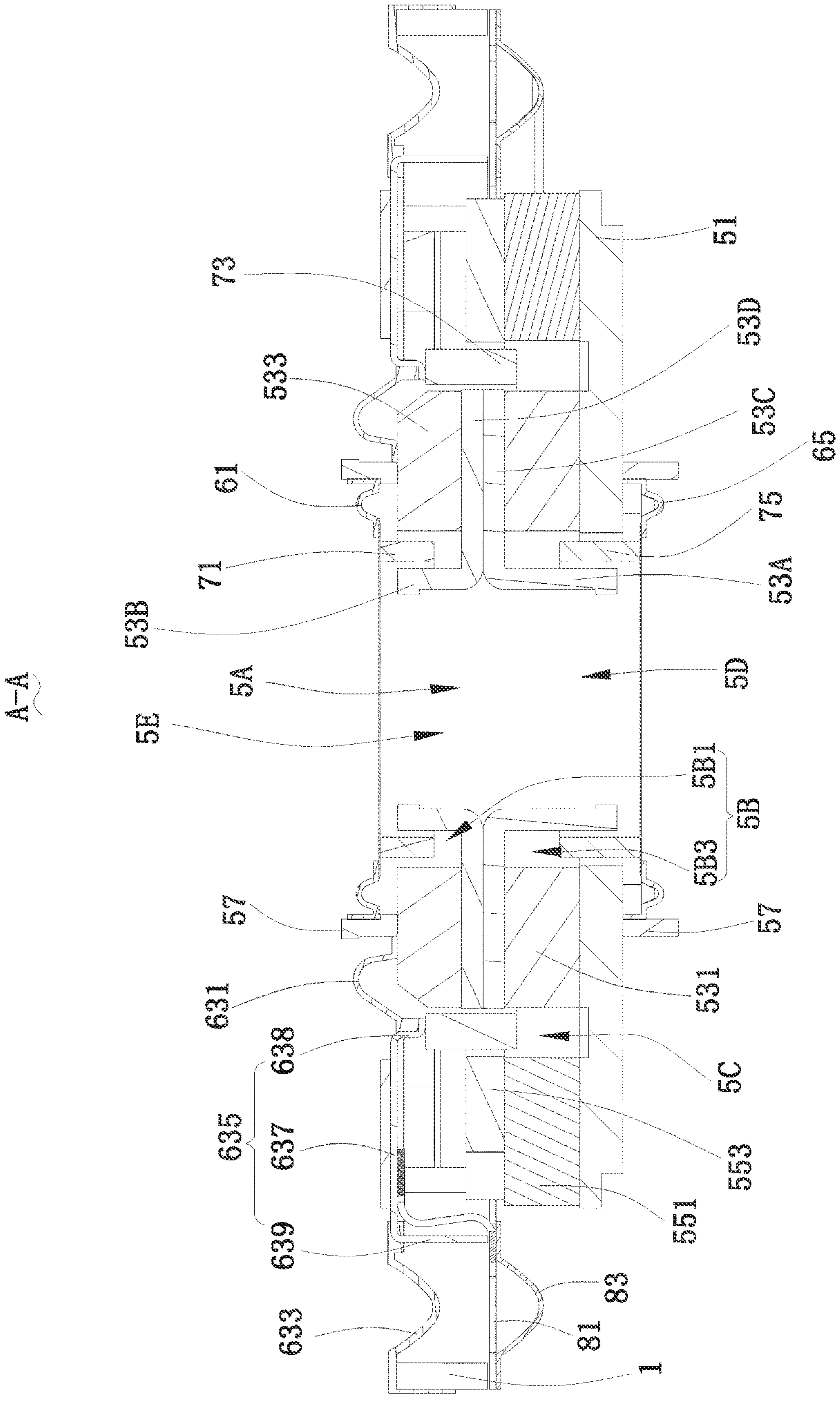
FIG. 5 is a cross-sectional schematic diagram of the coaxial speaker taken along the line A-A shown in FIG. 4.

As shown in FIG. 2 and FIG. 5, the wall portion 536 includes a first wall portion 53A and a second wall portion 53B. The first wall portion 53A is inserted into the first through hole 532. The second wall portion 53B is inserted into the second through hole 534. The plate portion 537 includes a first plate portion 53C and a second plate portion 53D. The first plate portion 53C extends from the first wall portion 53A and is fixedly disposed on the first magnet 531. The second plate portion 53D extends from the second wall portion 53B and is fixedly disposed between the first plate portion 53C and the second magnet 533. That is, the primary pole core 535 is composed of two separate pole cores.

In the present embodiment, the first wall portion 53A and the second wall portion 53B are both of the continuous annular structure. That is, the second magnetic gap 5B3 and the first cavity 5D are separated by the first wall portion 53A. The first magnetic gap 5B1 and the second cavity 5E are separated by the second wall portion 53B. The transmission cavity 5A includes the third through hole 511, the first cavity 5D, and the second cavity 5E, and does not include the first magnetic gap 5B1 and the second magnetic gap 5B3. It should be understood that, in other embodiments, the first wall portion 53A and the second wall portion 53B are both further composed of a plurality of split structures disposed at intervals. That is, the second magnetic gap 5B3 and the first cavity 5D are communicated through gaps between split bodies of the first wall portion 53A. The first magnetic gap 5B1 and the second cavity 5E are communicated through gaps between split bodies of the second wall portion 53B. The transmission cavity 5A includes the third through hole 511, the first cavity 5D, and the second cavity 5E, and further includes the first magnetic gap 5B1 and the second magnetic gap 5B3.

The secondary magnetic portion 55 includes a third magnet 551 and a secondary pole core 553. The third magnet 551 is fixedly disposed on the magnetic yoke 51. The secondary pole core 553 is fixedly disposed between the third magnet 551 and the frame 1. That is, the magnetic circuit system 5 is fixed to the frame 1 through the secondary pole core 553 and the frame 1.

The first magnet 531, the second magnet 533, and the third magnet 551 are all magnetized along a vibration direction of the vibrating diaphragm 6. The first magnet 531 and the second magnet 533 are disposed opposite in a same pole. Magnetizing directions of the first magnet 531 and the third magnet 551 are opposite.

It should be noted that the first magnet 531, the second magnet 533, and the third magnet 551 are artificial magnetic steels, or are formed by processing natural magnets. The primary pole core 535 and the secondary pole core 553 are both made of magnetic conductive materials.

It should be noted that the magnetic circuit system 5 is not limited to the above structure. For example, in other embodiments, the secondary magnetic portion 55 is not provided. Correspondingly, the magnetic circuit system 5 is fixed to the frame 1 by fixing the magnetic yoke 51 to the frame 1. Alternatively, the outer magnetic gap is further formed by the magnetic yoke and a primary magnet at intervals. Specifically, the magnetic yoke includes a bottom wall and a side wall. The bottom wall is fixedly disposed on the first magnet 531. The side wall extends from the bottom wall and is spaced from the primary magnet to form the outer magnetic gap.

Figure 3:
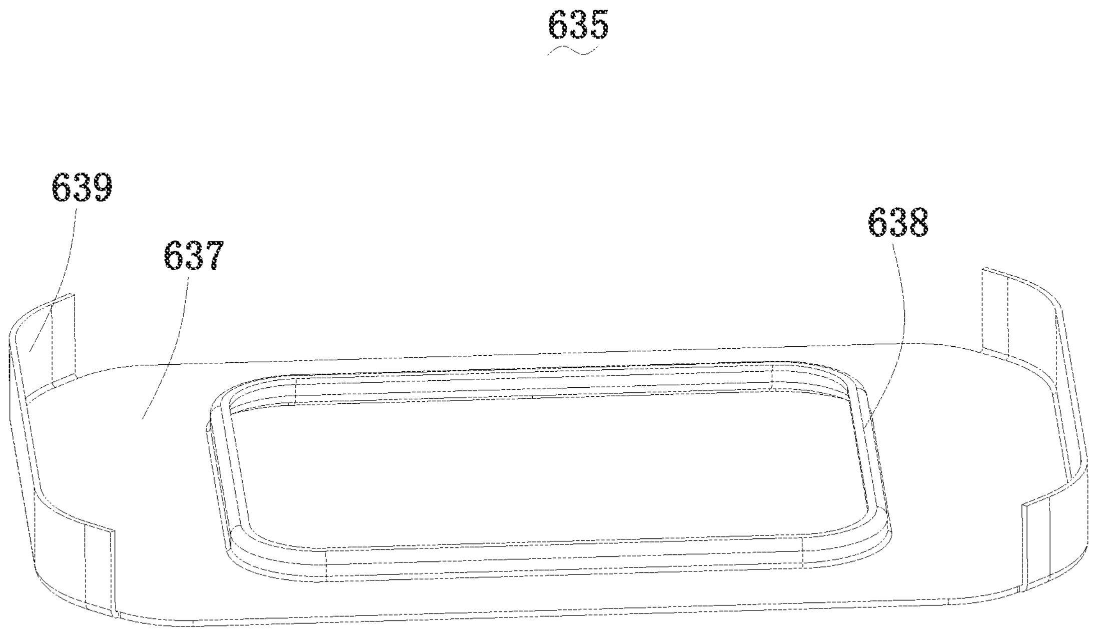
FIG. 3 is a structural schematic diagram of a framework in the coaxial speaker shown in FIG. 1.
Figure 4:
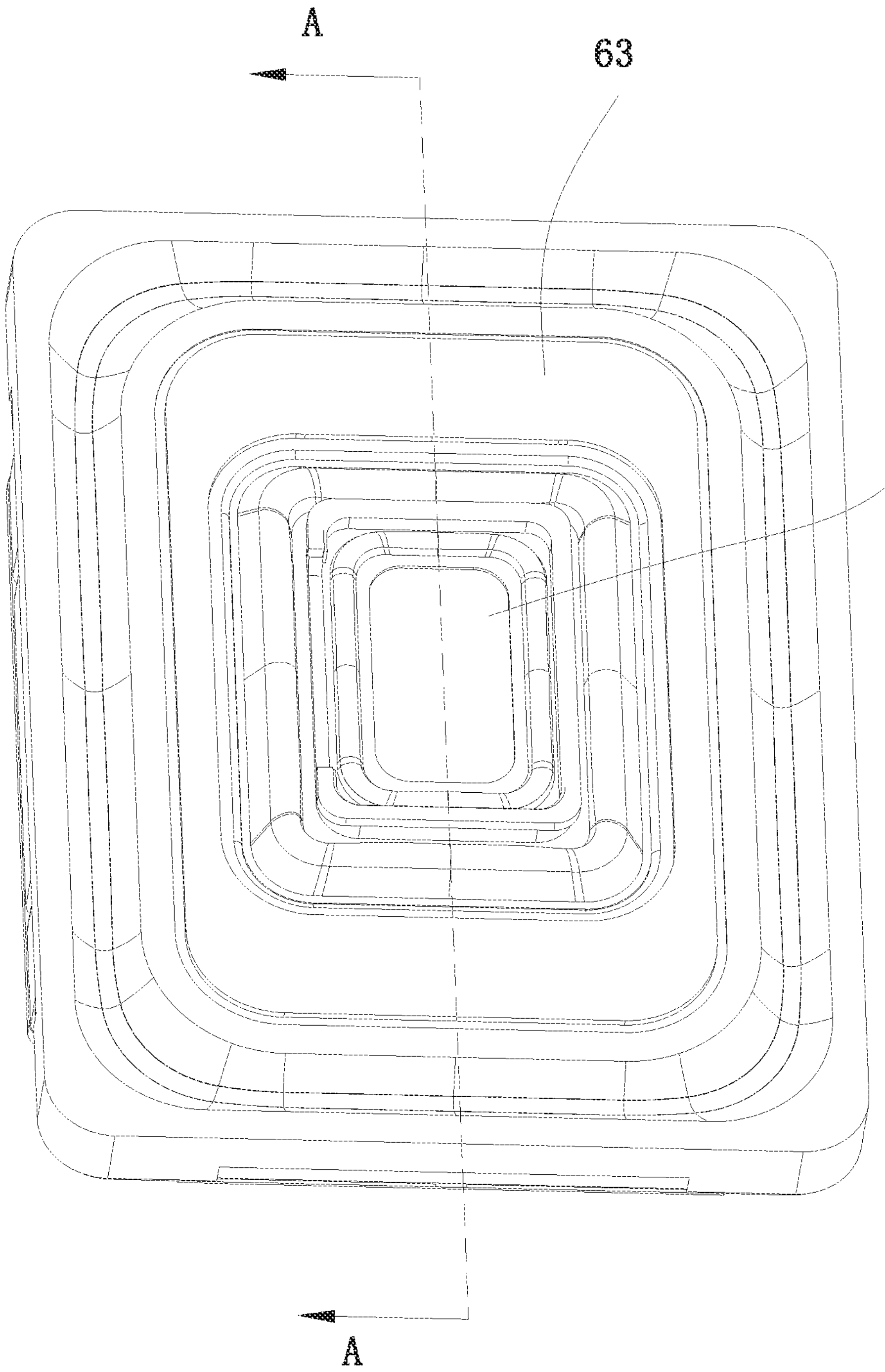
FIG. 4 is a structural schematic diagram of the coaxial speaker shown in FIG. 1 after assembling.

As shown in FIG. 3 and FIG. 5, the second vibrating diaphragm 63 includes an inner diaphragm body 631, an outer diaphragm body 633, and a framework 635. The outer diaphragm body 633 is disposed around the inner diaphragm body 631. The framework 635 includes a flat plate portion 637 and a first connecting portion 638. The flat plate portion 637 is connected to the inner diaphragm body 631 and the outer diaphragm body 633. The first connecting portion 638 extends from the flat plate portion 637 towards the outer magnetic gap 5C. The first connecting portion 638 is connected to the second voice coil 73. An inner periphery of the inner diaphragm body 631 is fixed to the second magnet 533. An outer periphery of the outer diaphragm body 633 is fixed to the frame 1.

As shown in FIG. 3 and FIG. 5, the framework 635 further includes a second connecting portion 639. The second connecting portion 639 extends from the flat plate portion 637. The second connecting portion 639 is spaced apart from the first connecting portion 638. The vibration system 3 further includes elastic supporting components 8. A first end of each of the elastic supporting components 8 is connected to the second connecting portion 639. A second end of each of the elastic supporting components 8 is connected to the frame 1.

In the embodiment, there are two elastic supporting components 8. The two elastic supporting components 8 are disposed at intervals along long axis direction of the coaxial speaker. In this way, the second voice coil 73 is prevented from swinging in the long axis direction through the elastic supporting components 8, which improves sound production quality.

Each of the elastic supporting components 8 includes a flexible circuit board 81 and a secondary vibrating diaphragm 83. The flexible circuit board 81 is fixedly disposed on one side, distal from the second vibrating diaphragm 63, of the frame 1. The flexible circuit board 81 is electrically connected to the second voice coil 73. The secondary vibrating diaphragm 83 is fixedly disposed on one side, distal from the second vibrating diaphragm 63, of the flexible circuit board 81.

In the embodiment, fixing frames 57 are fixedly disposed on two opposite sides of the magnetic circuit system 5. The outer periphery of the first vibrating diaphragm 61 and the outer periphery of the third vibrating diaphragm 65 are fixed to inner walls of the fixing frames 57. Specifically, one of the fixing frames 57 is fixed to one side, facing away from the first magnet 531, of the second magnet 533. One of the fixing frames 57 is further fixed to one side, facing away from the first magnet 531, of the magnetic yoke 51. That is, the first vibrating diaphragm 61 and the third vibrating diaphragm 65 are respectively and indirectly fixed to the magnetic circuit system 5 through the fixing frames 57. In this way, two opposite sides of the first vibrating diaphragm 61 and the third vibrating diaphragm 65 both have enough vibration space to avoid structures of avoiding vibration of the first vibrating diaphragm 61 and the third vibrating diaphragm 65 on the second magnet 533 and the magnetic yoke 51, thereby facilitating increase of a volume of the second magnet 533 and magnetism of the magnetic yoke 51, so as to increase strength of a magnetic field in the inner magnetic gap 5B and the outer magnetic gap 5C.

It should be noted that since the two opposite sides of the first vibrating diaphragm 61 and the third vibrating diaphragm 65 both have enough vibration space. That is, a certain gap is formed between the first vibrating diaphragm 61 and the magnetic circuit system, and a certain gap is formed between the third vibrating diaphragm 65 and the magnetic circuit system. Therefore, in the embodiment, the transmission cavity 5A further includes a space between the first vibrating diaphragm 61 and the magnetic circuit system 5 and a space between the third vibrating diaphragm 65 and the magnetic circuit system 5.

In the present embodiment, the first vibrating diaphragm 61 and the third vibrating diaphragm 65 have the same structure. Taking the third vibrating diaphragm 65 as an example, the third vibrating diaphragm 65 includes a third diaphragm body 651 and a third ball top 653. An outer periphery of the third diaphragm body 651 is fixed to the inner walls of the fixing frames 57. An inner periphery of the third diaphragm body 651 is fixed to the third ball top 653.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A coaxial speaker, comprising:

a frame;

a vibration system; and a magnetic circuit system;

wherein the vibration system and the magnetic circuit system are fixed to the frame; the vibration system comprises a vibrating diaphragm and a voice coil; the magnetic circuit system comprises a transmission cavity, an inner magnetic gap, and an outer magnetic gap, the inner magnetic gap is defined around the transmission cavity, the outer magnetic gap is defined around the inner magnetic gap; the inner magnetic gap comprises a first magnetic gap and a second magnetic gap, the first magnetic gap and the second magnetic gap are disposed at intervals; the transmission cavity penetrates through the magnetic circuit system; the vibrating diaphragm comprises a first vibrating diaphragm, a second vibrating diaphragm, and a third vibrating diaphragm; the second vibrating diaphragm is disposed around the first vibrating diaphragm, the third vibrating diaphragm and the first vibrating diaphragm reversely vibrate, an outer periphery of the first vibrating diaphragm and an inner periphery of the second vibrating diaphragm are both fixed to the magnetic circuit system, the outer periphery of the second vibrating diaphragm is fixed to the frame; an outer periphery of the third vibrating diaphragm is fixed to one side, facing away from the first vibrating diaphragm, of the magnetic circuit system; the first vibrating diaphragm and the third vibrating diaphragm seal the transmission cavity, the voice coil comprises a first voice coil, a second voice coil, and a third voice coil; the first voice coil is inserted into the first magnetic gap and drives the first vibrating diaphragm to vibrate, the second voice coil is inserted into the outer magnetic gap and drives the second vibrating diaphragm to vibrate, and the third voice coil is inserted into the second magnetic gap and drives the third vibrating diaphragm to vibrate.

2. The coaxial speaker according to claim 1, wherein the magnetic circuit system comprises a magnetic yoke and a primary magnetic portion, the primary magnetic portion is surrounded by the outer magnetic gap, the primary magnetic portion comprises a first magnet, a second magnet, and a primary pole core; the first magnet is fixedly disposed on the magnetic yoke, the second magnet is disposed on one side, facing the first vibrating diaphragm, of the first magnet; a first through hole penetrates through the first magnet, a second through hole penetrates through the second magnet; the primary pole core comprises a wall portion and a plate portion, the plate portion is connected to the wall portion, the plate portion is clamped between the first magnet and the second magnet; a first end of the wall portion is inserted into the first through hole and divides the first through hole into the second magnetic gap and a first cavity, a second end of the wall portion is inserted into the second through hole and divides the second through hole into the first magnetic gap and a second cavity; a third through hole penetrates through the magnetic yoke, and the transmission cavity comprises the third through hole, the first cavity, and the second cavity.

3. The coaxial speaker according to claim 2, wherein the wall portion comprises a first wall portion and a second wall portion, the first wall portion is inserted into the first through hole, the second wall portion is inserted into the second through hole; the plate portion comprises a first plate portion and a second plate portion, the first plate portion extends from the first wall portion and is fixedly disposed on the first magnet, and the second plate portion extends from the second wall portion and is fixedly disposed between the first plate portion and the second magnet.

4. The coaxial speaker according to claim 3, wherein the first wall portion is a continuous annular structure or/and the second wall portion is the continuous annular structure.

5. The coaxial speaker according to claim 2, wherein the outer periphery of the first vibrating diaphragm and the inner periphery of the second vibrating diaphragm are both fixed to the second magnet, and the outer periphery of the third vibrating diaphragm is fixed to one side, facing away from the primary magnetic portion, of the magnetic yoke.

6. The coaxial speaker according to claim 2, wherein the magnetic circuit system further comprises a secondary magnetic portion, the secondary magnetic portion is fixedly disposed between the magnetic yoke and the frame, and the secondary magnetic portion and the primary magnetic portion are spaced to form the outer magnetic gap.

7. The coaxial speaker according to claim 6, wherein the secondary magnetic portion comprises a third magnet and a secondary pole core, the third magnet is fixedly disposed on the magnetic yoke, and the secondary pole core is fixedly disposed between the third magnet and the frame.

8. The coaxial speaker according to claim 1, wherein the second vibrating diaphragm comprises an inner diaphragm body, an outer diaphragm body, and a framework; the outer diaphragm body is disposed around the inner diaphragm body, the framework comprises a flat plate portion and a first connecting portion, the flat plate portion is connected to the inner diaphragm body and the outer diaphragm body, the first connecting portion extends from the flat plate portion towards the outer magnetic gap, and the first connecting portion is connected to the second voice coil.

9. The coaxial speaker according to claim 8, wherein the framework further comprises a second connecting portion, the second connecting portion extends from the flat plate portion, the second connecting portion is spaced apart from the first connecting portion, the vibration system further comprises elastic supporting components, a first end of each of the elastic supporting components is connected to the second connecting portion, and a second end of each of the elastic supporting components is connected to the frame.

10. The coaxial speaker according to claim 1, wherein fixing frames are fixedly disposed on two opposite sides of the magnetic circuit system, the outer periphery of the first vibrating diaphragm and the outer periphery of the third vibrating diaphragm are fixed to inner walls of the fixing frames.

* * * * *